(12) United States Patent
Eddies et al.

(10) Patent No.: US 8,071,154 B2
(45) Date of Patent: Dec. 6, 2011

(54) ICE CONFECTION

(75) Inventors: Natalie Elaine Eddies, Sharnbrook (GB); Ian David Lacy, Sharnbrook (GB); Loyd Wix, Sharnbrook (GB)

(73) Assignee: Conopco, Inc., Englewood Cliffs, NJ (US)

( * ) Notice: Subject to any disclaimer, the term of this patent is extended or adjusted under 35 U.S.C. 154(b) by 455 days.

(21) Appl. No.: 12/220,979

(22) Filed: Jul. 30, 2008

(65) Prior Publication Data

US 2009/0035418 A1  Feb. 5, 2009

(30) Foreign Application Priority Data

Jul. 31, 2007 (EP) ..................................... 07113487
Jul. 31, 2007 (EP) ..................................... 07113488

(51) Int. Cl.
*A23G 9/00* (2006.01)

(52) U.S. Cl. ........................................ 426/660; 426/565

(58) Field of Classification Search ................... 426/99, 426/100, 101, 565, 660
See application file for complete search history.

(56) References Cited

U.S. PATENT DOCUMENTS

| | | | |
|---|---|---|---|
| 3,582,357 A | 6/1971 | Katz | |
| 5,077,076 A | 12/1991 | Gonsalves et al. | |
| 5,215,776 A * | 6/1993 | Peterson | 426/565 |
| 5,246,725 A | 9/1993 | Fisher et al. | |
| 5,384,146 A | 1/1995 | Gonsalves et al. | |
| 5,486,373 A | 1/1996 | Holt et al. | |
| 5,968,582 A * | 10/1999 | Vaghela et al. | 426/565 |
| 6,090,429 A * | 7/2000 | Wilson | 426/548 |
| 6,096,867 A | 8/2000 | Byass et al. | |
| 6,613,374 B1 * | 9/2003 | Fayard et al. | 426/565 |
| 2003/0035877 A1 | 2/2003 | Best et al. | |
| 2004/0091597 A1 * | 5/2004 | Ghaffari et al. | 426/565 |
| 2006/0141103 A1 * | 6/2006 | Heritage et al. | 426/100 |

FOREIGN PATENT DOCUMENTS

| | | |
|---|---|---|
| EP | 1673980 | 6/2006 |
| WO | WO 93/21778 | 11/1993 |
| WO | WO 93/21779 | 11/1993 |
| WO | WO 01/30175 | 5/2001 |
| WO | WO 02/41702 | 5/2002 |
| WO | WO 02/089596 | 11/2002 |
| WO | WO 2006099987 A1 * | 9/2006 |

OTHER PUBLICATIONS

Marshall et al., Ice Cream, Aspen publication, Fifth Edition, p. 2.*
European Search Report Application No. EP 07113487 dated Jun. 13, 2008.
Co-pending application Wix, U.S. Appl. No. 12/220,970, filed Jul. 30, 2008.
European Search Report Application No. EP 08160208 completed Nov. 13, 2008.
Office Action dated Dec. 1, 2010 for Wix. U.S. Appl. No. 12/220,970, filed Jul. 30, 2008.
Smith et al., "Effects on Freezing Point of Carbohydrates Commonly Used in Frozen Desserts", 1983, J. Dairy Sci 66:2464-2467.

* cited by examiner

*Primary Examiner* — Jyoti Chawla
(74) *Attorney, Agent, or Firm* — Michael P. Aronson

(57) ABSTRACT

An ice confection is provided comprising from 11 to 30% (by weight of the confection) of glucose syrup solids having a dextrose equivalent (DE) of less than 20, and from 3 to 16 wt % low molecular weight sweeteners. A process for producing the ice confection is also provided.

10 Claims, No Drawings

ICE CONFECTION

FIELD OF THE INVENTION

The present invention relates to ice confections. In particular, it relates to ice confections that have an unusual texture.

BACKGROUND TO THE INVENTION

Ice confections such as water ices and milk ices are well known and popular products. However, in order to maintain consumer interest there is a continual need to provide novel ice confections, for example, having new and unusual texture, taste or appearance. Conventional ice confections have hard, icy textures, and it would be desirable to be able to reproduce the chewy textures of other confections, such as caramel, gums, jellies and the like.

WO 02/089596 discloses chewy candy analogues that are compatible with ice confectionery products. Composite frozen products comprising the candy analogue and an ice confection are described. However, the ice confection itself is not chewy. Thus there remains a need for ice confections which have a chewy texture.

SUMMARY OF THE INVENTION

We have now found that ice confections having a chewy texture can be produced by employing a combination of low dextrose equivalent (DE) glucose syrup and low molecular weight sweeteners. Accordingly, in a first aspect, the present invention provides an ice confection comprising from 11 to 30% (by weight of the confection) of glucose syrup solids having a dextrose equivalent (DE) of less than 20, and from 3 to 16 wt % low molecular weight sweeteners.

Preferably the ice confection comprises from 12 to 25% of a glucose syrup having a DE of less than 20, more preferably from 15 to 25%.

Preferably the glucose syrup has a DE of less than 15, more preferably less than 10. Preferably the glucose syrup has a DE of at least 3, more preferably at least 5.

Preferably the ice confection comprises less than 12 wt %, more preferably less than 8% low molecular weight sweeteners. Preferably also the ice confection comprises at least 5% low molecular weight sweeteners, more preferably at least 7 wt %.

Preferably the ice confection has an overrun of less than 50%. In a preferred embodiment the ice confection is unaerated.

Preferably the ice confection is a water ice, a fruit ice, a milk ice or a low-fat ice cream.

DETAILED DESCRIPTION OF THE INVENTION

Unless defined otherwise, all technical and scientific terms used herein have the same meaning as commonly understood by one of ordinary skill in the art (e.g. in frozen confectionery manufacture). Definitions and descriptions of various terms and techniques used in frozen confectionery manufacture are found in Ice Cream, 6th Edition, Robert T. Marshall, H. Douglas Goff and Richard W. Hartel (2003), Kluwer Academic/Plenum Publishers. All percentages, unless otherwise stated, refer to the percentage by weight, with the exception of percentages cited in relation to the overrun.

Ice confections are sweet-tasting fabricated foodstuffs intended for consumption in the frozen state (i.e. under conditions wherein the temperature of the foodstuff is less than 0° C., and preferably under conditions wherein the foodstuff comprises significant amounts of ice). Ice confections include water ices, fruit ices and milk ices. At a temperature of −18° C. most, but not all, of the water in the ice confection is frozen. Water ices are substantially fat-free and/or protein-free. By substantially fat- and protein free it is meant that the fat content is less than 0.5 wt % and that the protein content is less than 0.5 wt %. Fruit ices are water ices which contain at least 10% fruit (i.e. the edible part of fruit or the equivalent as juice, extracts, concentrated or dehydrated products and so on). Fruit, pulp, juice or any other preparation may be used either fresh or preserved by any convenient technical process. Milk ices and low-fat ice creams additionally contain typically 1-3wt % of fat (normally dairy fat) and about 6-15 % milk solids non fat.

The term glucose syrup (sometimes called corn syrup) refers to starch hydrolysates consisting essentially of mono-, di-, and higher saccharides. They may be dry or contain water. The ice confections of the invention contain from 11 to 30 wt %, preferably from 12 to 25 wt %, more preferably from 15 to 25 wt % of glucose syrup solids. Glucose syrups can be made from starch from any source, such as corn, wheat, rice and potatoes. Since glucose syrups are complex multi-component sugar mixtures, they are commonly classified by their dextrose equivalent (DE). The DE is related to the number average molecular weight $<M>_n$ of the sugars, and can be calculated from the equation below (Journal of Food Engineering, 33 (1997) 221-226):

$$<M>_n = 18016/DE$$

Starch hydrosylates with a DE of about 20 or below are commonly known as maltodextrins. Due to their low DE, they contain only small amounts of mono- and disaccharides.

The term low molecular weight sweeteners refers to mono- and di-saccharide sugars (such as dextrose, fructose, sucrose and lactose), polyhydric alcohols (such as glycerol) and sugar alcohols. Sugar alcohols are hydrogenated sugars, and include eythritol, arabitol, xylitol, sorbitol, mannitol, lactitol, maltitol, hydrogenated starch hydrosylate (HSH)—also known as polyglycitol, isomalt, and palatinose. The total low molecular weight sweetener content of an ice confection is thus the sum of all of the sugars and sugar alcohols present in the confection, including sugars from the glucose syrup (dextrose and maltose), from fruit (fructose) and from milk solids (lactose). The low molecular weight sweeteners make up less than 16 wt %, preferably less than 12%, more preferably less than 8% of the ice confections of the present invention. The low molecular weight sweeteners preferably make up more than 3 wt %, preferably more than 5%, more preferably more than 7% of the ice confections.

We have found that the combination of low DE glucose syrups and particular amounts of low molecular weight sweeteners result in ice confections which have a chewy texture. The higher the DE of the glucose syrup, the greater is the amount of low molecular weight sugars (dextrose and maltose) it contains. Therefore, when using glucose syrups having DE in the higher end of the range (such as DE=15-20), smaller amounts of low molecular weight sweeteners should be used, and vice versa.

The ice confections may also comprise a stabiliser. Stabilisers that may be used include proteins such as gelatin; plant extrudates such as gum arabic, gum ghatti, gum karaya, gum tragacanth; seed gums such as locust bean gum, guar gum, psyyllium seed gum, quince seed gum or tamarind seed gum; seaweed extracts such as agar, alganates, carrageenan or furcelleran; pectins such as low methoxyl or high methoxyl-type pectins; cellulose derivatives such as sodium carboxymethyl cellulose, microcrystalline cellulose, methyl and methylethyl celluloses, or hydroxylpropyl and hydroxypropylmethyl celluloses; and microbial gums such as dextran, xanthan or β-1,3-glucan. Preferably, the stabiliser is selected from locust bean gum, kappa carrageenan, guar gum or mixtures thereof. Preferably the stabilisers are present at a level of 0.05 to 1% by weight of the ice confection.

Ice confections of the invention may also contain other ingredients, for example colours and flavours.

The ice confection may be aerated or unaerated. Preferably the ice confection is unaerated. An unaerated ice confection is not subjected to deliberate steps such as whipping to increase the gas content. Nonetheless, it will be appreciated that during the preparation of unaerated ice confections, low levels of gas, such as air, may be incorporated in the product. The ice confection preferably has an overrun of less then 30%, more preferably less than 20%, most preferably less than 10%. Overrun is defined by the following equation:

$$\text{overrun (\%)} = \frac{\text{density of mix} - \text{density of ice confection}}{\text{density of ice confection}} \times 100.$$

In this equation, "mix" refers to the unaerated mix prior to aeration (or following de-aeration of the melted ice confection). Overrun is measured at atmospheric pressure.

The ice confections may be manufactured by any suitable process. However, in a further aspect of the invention there is provided a process for manufacturing the ice confection, the process comprising the steps of:
1. preparing a mix of ingredients; then
2. pasteurising and optionally homogenising the mix; then
3. freezing and optionally aerating the mix to produce the ice confection.

Freezing may take place under shear (for example in a scraped surface heat exchanger) or may be quiescent. By quiescent (or static) freezing, it is meant a process wherein the mix is cooled below its freezing point, such that partial or total solidification occurs through ice crystal formation, in the absence of an imposed shear field. Thus the liquid is frozen without it being deliberately agitated, mixed or shaken during freezing. Examples of quiescent processes include (but are not limited to) placing a container containing the mix into a cold environment and immersing a mould containing the mix in a bath of cold refrigerant. Preferably freezing is quiescent due to the simplicity of the process.

The present invention will now be further described with reference to the following examples, which are illustrative only and non-limiting.

EXAMPLES

Examples 1 to 6 are water ice formulations according to the invention. Comparative example A is a standard water ice formulation, which does not contain low DE glucose syrup. Their formulations are shown in table 1. The amounts of low molecular weight sweeteners present in the glucose syrup and the resulting total amount of low molecular weight sweeteners present in the ice confection (i.e. including those from the glucose syrup) are also shown.

TABLE 1

| Ingredient (wt %) | 1 | 2 | 3 | 4 | 5 | 6 | A | B |
|---|---|---|---|---|---|---|---|---|
| Sucrose | 11.5 | 7.7 | 3.8 | 15.5 | 11.5 | 7.5 | 23 | |
| 18 DE glucose syrup | 15.0 | 20.0 | 25.0 | | | | | |
| 9 DE glucose syrup | | | | 11.0 | 16.5 | 22.0 | | |
| 6 DE glucose syrup | | | | | | | | 20.0 |
| Locust Bean Gum | | | | 0.05 | | | | |
| Citric acid | | | | 0.45 | | | | 0.2 |
| Flavour + Colour | | | | 0.1 | | | | 0.2 |
| Aspartame | | | | | | | | 0.07 |
| Water | | | | To 100% | | | | |
| Low Mw sweeteners from glucose syrup | 0.8 | 1.0 | 1.2 | 0.4 | 0.6 | 0.8 | 0.0 | 0.3 |
| Total low Mw sweeteners | 12.3 | 8.7 | 5.1 | 15.9 | 12.1 | 8.3 | 23.0 | 0.3 |

18 DE glucose syrup was C*Dry MD 01915 maltodextrin, supplied by Cerestar, which consisted (on a dry basis) of 1% dextrose, 6% maltose, 9% maltotriose and 84% saccharides of degree of polymerisation (DP) 4 and above. 9 DE glucose syrup was C*Dry MD 01958 maltodextrin, supplied by Cerestar, which consisted (on a dry basis) of 1% dextrose, 2% maltose, 2% maltotriose and 95% saccharides of DP 4 and above. 6 DE glucose syrup consisted (on a dry basis) of 0.5% dextrose, 1% maltose, 1.5% maltotriose and 97% saccharides of DP 4 and above.

Water ice products in the form of ice follies (approximately 100 mls in volume) on sticks were prepared as follows. First the dry ingredients, except for the citric acid and the flavour, were blended together with the water and heated to 83° C. in order to dissolve them and to pasteurize the mix. The mix was then cooled in a chill room, and citric acid and flavour were added. The mix was then placed in moulds immersed in a brine bath at −40° C. to quiescently freeze the mix. Sticks were inserted when the mix was partially frozen. After the products had frozen, they were removed from the moulds and stored at −18° C. before being subjected to sensory assessment.

A blind product test was conducted using a panel of 12 assessors to assess the sensory characteristics of the water ice products of examples 1 to 6, in particular the chewiness. The assessors consumed a quarter of each product. The test design was balanced for serving order of the samples, and each product was assessed 3 times by each assessor. The chewiness was assessed by the biting the end off with the front teeth and chewing three times. Samples were scored on a scale of 0 to 10 (where 0 is not chewy and 10 is very chewy).

The results of the sensory analysis are shown in Table 3. It can be seen that examples 1 to 6 had chewiness scores ranging from about 3 to more than 7, much higher than the standard water ice, comparative example A, which had a score of about 1.

TABLE 2

| | | Example | | | | | |
|---|---|---|---|---|---|---|---|
| | Comparative A | 1 | 2 | 3 | 4 | 5 | 6 |
| Chewiness | 1.04 | 3.04 | 4.97 | 6.47 | 3.01 | 6.27 | 7.25 |

Comparative example B was too hard to be bitten at −18° C. On warming it became softer, but the product was fractile and broke into small, relatively hard chunks on biting. The texture was not chewy.

Example 7 is a water ice containing large ice pieces. A concentrated mix was produced according to the formulation in Table 3. This was partially frozen in a standard ice cream freezer. Ice particles (typically a few mm in size) were then combined with the partially frozen mix in a ratio of 25% ice particles to 75% mix. This mixture was then hardened. The final product had the formulation also shown in Table 3.

On consumption the water ice had a chewy texture, combined with a pleasant, refreshing sensation arising from the ice particles.

TABLE 3

| Ingredient (wt %) | Concentrated Mix | Final Product |
| --- | --- | --- |
| Sucrose | 14.7 | 11.0 |
| 18DE glucose syrup | 14.7 | 11.0 |
| Locust bean gum | 0.27 | 0.20 |
| Citric Acid | 0.33 | 0.25 |
| Flavour | 0.13 | 0.10 |
| Water | 69.9 | 77.5 |
| Low Mw sweeteners from glucose syrup | | 0.4 |
| Total low Mw sweeteners | | 11.4 |

Example 8 is a low fat ice cream having the formulation shown in Table 4. The ice cream was produced using a conventional process (i.e. mixing ingredients, ageing, pasteurization, homogenization, freezing and aeration in an ice cream freezer and hardening).

| Ingredient (wt %) | |
| --- | --- |
| Skim Milk Powder | 13 |
| Fructose | 8.5 |
| 18DE glucose syrup | 12 |
| LBG | 0.16 |
| Guar Gum | 0.06 |
| Carrageenan L100 | 0.02 |
| Butterfat | 1.0 |
| Emulsifier HP60 | 0.2 |
| Water | To 100 |
| Low Mw sweeteners from glucose syrup | 0.6 |
| Low Mw sweeteners from SMP | 6.5 |
| Total low Mw sweeteners | 15.6 |

On consumption, the ice cream had a chewy texture unlike conventional low fat ice cream (which is not chewy).

The various features and embodiments of the present invention, referred to in individual sections above apply, as appropriate, to other sections, mutatis mutandis. Consequently features specified in one section may be combined with features specified in other sections, as appropriate.

The invention claimed is:

1. An ice confection having a chewy texture comprising from 15% to 25% by weight of the confection of glucose syrup solids having a dextrose equivalent (DE) of at least 5 and less than 20, and from 5 to 16 wt % low molecular weight sweeteners, wherein the ice confection at a temperature of −18° C. has a chewiness score, assessed by a sensory panel test, of at least 3 on a scale of 0 to 10 (where 0 is not chewy and 10 is very chewy).

2. An ice confection according to claim 1, wherein the glucose syrup has a dextrose equivalent in the range from at least 5 to less than 10;
and wherein the low molecular weight sweetener is present at a level of more than 7 wt %.

3. An ice confection according to claim 1 comprising less than 12% low molecular weight sweeteners.

4. An ice confection according to claim 1, wherein the low molecular weight sweeteners is present in an amount of more than 7 wt % to less than 12 wt %.

5. An ice confection according to claim 1 which has an overrun of less than 50%.

6. An ice confection according to claim 1 which is a water ice or a fruit ice.

7. An ice confection according to claim 1 which is a milk ice or a low-fat ice cream.

8. An ice confection according to claim 1, wherein the ice confection at a temperature of −18° C. has a chewiness score, assessed by a sensory panel, of more than 7 on a scale of 0 to 10 (where 0 is not chewy and 10 is very chewy).

9. An ice confection having a chewy texture comprising from 15% to 25% by weight of the confection of glucose syrup solids having a dextrose equivalent (DE) of at least 5 and less than 10, and at least 7% to less than 12 wt % low molecular weight sweeteners, wherein the ice confection at a temperature of −18° C. has a chewiness score, assessed by a sensory panel test, of at least 7 on a scale of 0 to 10 (where 0 is not chewy and 10 is very chewy).

10. A process for preparing an ice confection having a chewy texture, comprising the steps of:
a) preparing a mix comprising from 15 to 25% by weight of the confection of glucose syrup solids having a dextrose equivalent of at least 5 and less than 20, and from 5 to 16 wt % low molecular weight sweeteners;
b) pasteurising and optionally homogenising the mix; then
c) freezing and optionally aerating the mix;
wherein the ice confection at a temperature of −18° C. has a chewiness score, assessed by a sensory panel test, of at least 3 on a scale of 0 to 10 (where 0 is not chewy and 10 is very chewy).

* * * * *